(12) United States Patent
Dudda et al.

(10) Patent No.: US 12,120,185 B2
(45) Date of Patent: Oct. 15, 2024

(54) METHODS AND APPARATUSES FOR PROVIDING HEADER COMPRESSION PROTOCOL RESET

(71) Applicant: Telefonaktiebolaget LM Ericsson (PUBL), Stockholm (SE)

(72) Inventors: Torsten Dudda, Wassenberg (SE); Zhenhua Zou, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/249,683

(22) PCT Filed: Oct. 19, 2021

(86) PCT No.: PCT/EP2021/078990
§ 371 (c)(1),
(2) Date: Apr. 19, 2023

(87) PCT Pub. No.: WO2022/084339
PCT Pub. Date: Apr. 28, 2022

(65) Prior Publication Data
US 2023/0412688 A1    Dec. 21, 2023

Related U.S. Application Data

(60) Provisional application No. 63/104,072, filed on Oct. 22, 2020.

(51) Int. Cl.
G06F 15/173      (2006.01)
H04L 67/141      (2022.01)
H04L 69/04       (2022.01)

(52) U.S. Cl.
CPC ............ *H04L 67/141* (2013.01); *H04L 69/04* (2013.01)

(58) Field of Classification Search
CPC .............................. H04L 67/141; H04L 69/04
(Continued)

(56) References Cited

U.S. PATENT DOCUMENTS

| 11,627,625 B2 * | 4/2023 | Mildh | H04W 76/18 |
| | | | 455/458 |
| 2019/0053099 A1 * | 2/2019 | Kim | H04W 28/0278 |

FOREIGN PATENT DOCUMENTS

| CN | 104168214 A | * 11/2014 | |
| CN | 109561516 B | * 9/2021 | H04L 1/1607 |
| WO | WO-2019153109 A1 | * 8/2019 | |

OTHER PUBLICATIONS

PCT International Search Report issued for International application No. PCT/EP2021/078990—Jan. 21, 2022.
(Continued)

*Primary Examiner* — Liang Che A Wang
(74) *Attorney, Agent, or Firm* — Baker Botts L.L.P.

(57) ABSTRACT

According to an aspect, there is provided a method performed by a wireless device for performing Packet Data Convergence Protocol, PDCP, entity re-establishment. The wireless device is acting as a Packet Data Convergence Protocol, PDCP, receiving entity. The method comprises receiving (101) a request to perform PDCP entity re-establishment; responsive to the request, resetting (103) a header compression protocol by discarding any contexts associated with the header compression protocol, and refraining (105) from transmitting feedback associated with the header compression protocol to a PDCP transmitting entity.

16 Claims, 12 Drawing Sheets

(58) Field of Classification Search
USPC .......................................... 709/227, 228, 230
See application file for complete search history.

(56) References Cited

OTHER PUBLICATIONS

PCT Written Opinion of the International Searching Authority issued for International application No. PCT/EP2021/078990—Jan. 21, 2022.
3GPP TS 38.323 V16.2.0 (Sep. 2020); 3rd Generation Partnership Project; Technical Specification Group Radio Access Network; NR; Packet Data Convergence Protocol (PDCP) specification (Release 16).
3GPP TSG-RAN WG2 #107bis; Chongqing, China, Oct. 14-18, 2019; Agenda Item: 6.7.2.3; Source: Ericsson; Title: Ethernet header compression (Tdoc R2-1912553).
3GPP TSG-RAN WG2 Meeting #99; Berlin, Germany, Aug. 21-25, 2017; Agenda item: 10.3.3.6; Source: Samsung; Title: ROHC Reset at PDCP re-establishment (R2-1709031)—Aug. 21-25, 2017.

* cited by examiner

METHODS AND APPARATUSES FOR PROVIDING HEADER COMPRESSION PROTOCOL RESET

PRIORITY

This nonprovisional application is a U.S. National Stage Filing under 35 U.S.C. § 371 of International Patent Application Serial No. PCT/EP2021/078990 filed Oct. 19, 2021 and entitled "METHODS AND APPARATUSES FOR PROVIDING HEADER COMPRESSION PROTOCOL RESET" which claims priority to U.S. Provisional Patent Application No. 63/104,072 filed Oct. 22, 2020, both of which are hereby incorporated by reference in their entirety.

TECHNICAL FIELD

This disclosure relates to methods and apparatuses for providing a reset of a header compression protocol.

BACKGROUND

In 5G NR, packet data convergence protocol (PDCP) can be re-established e.g. during a handover procedure. During the PDCP re-establishment procedure, some procedures and states are re-initialized. The procedure is specified in 3GPP TS 38.323 v16.2.0.

Ethernet header compression (EHC) had been specified as part of New Radio (NR) PDCP. With Ethernet header compression (EHC) protocol, headers of Ethernet frames transmitted over NR are removed. PDCP data with the Ethernet header is first sent uncompressed from compressor (or the PCDP transmitting entity) to decompressor (or the PCDP receiving entity), and it is associated with a context ID. The decompressor, establishes an EHC context on its side, for example by saving the context ID and Ethernet header. The decompressor may then send EHC feedback to the compressor, informing the compressor that the EHC context has been established successfully. The compressor may thereafter send further data which corresponds to the same context as compressed data (in other words, without the Ethernet header). The decompressor is able to reconstruct the full data (i.e. the Ethernet header) by retrieving the Ethernet header from the stored context.

SUMMARY

There currently exist certain challenge(s). At PDCP re-establishment, according to current specifications, the EHC protocol is reset. It is currently not clear what operation(s) this "reset" includes.

Certain aspects of the present disclosure and their embodiments may provide solutions to these or other challenges. The object of the present invention is achieved by the independent claims. Advantageous embodiments are described in the dependent claims. Embodiments described herein provide methods and apparatuses for the PDCP receiving entity to exceptionally refrain from transmitting EHC feedback during a PDCP re-establishment procedure i.e. when EHC protocol is reset.

There are, proposed herein, various embodiments which address one or more of the issues disclosed herein.

Certain embodiments may provide one or more of the following technical advantage(s). By ensuring that EHC feedback is not transmitted during the header compression protocol reset, problems with synchronization between the compressor and decompressor leading to data loss are avoided.

BRIEF DESCRIPTION OF THE DRAWINGS

Some of the embodiments contemplated herein will now be described more fully with reference to the accompanying drawings, in which.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

At PDCP re-establishment, when drb-ContinueEHC-UL/DL is not configured, the EHC protocol is reset. In current specifications, it is not further clarified, what the reset actually means for the EHC protocol. In the 3GPP TS 38.323 v16.2.0 annex, where EHC is defined, it is however remaining unclear what reset for EHC means.

Figure 1:
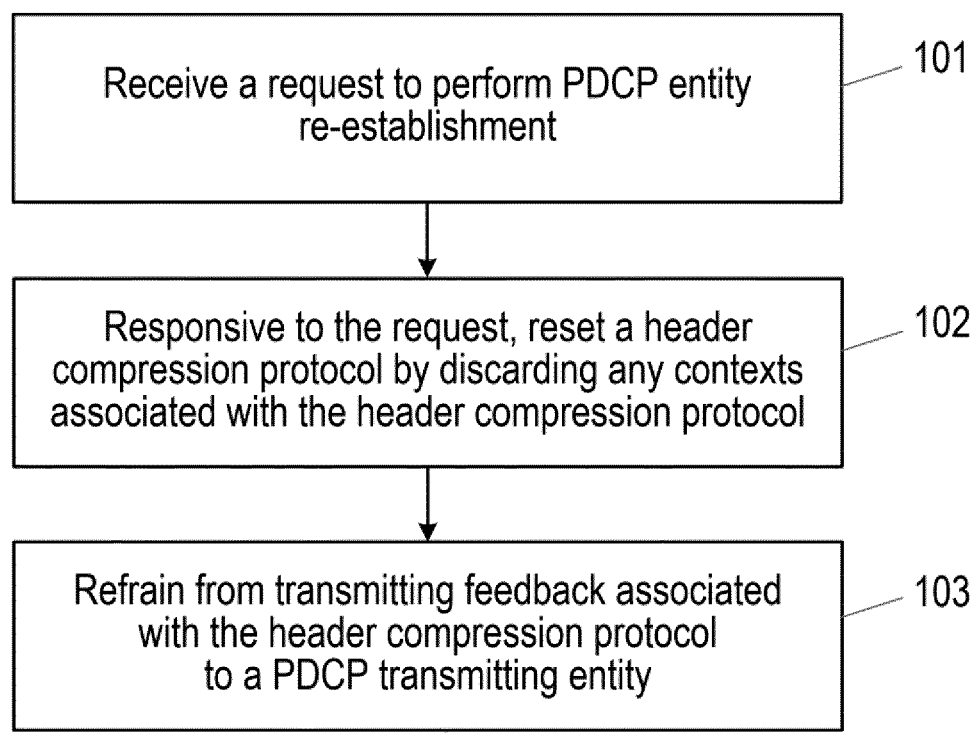
FIG. 1 is a flow chart illustrating a method in a PDCP receiving entity in accordance with some embodiments.

FIG. 1 illustrates a method in a Packet Data Convergence Protocol, PDCP, receiving entity for performing PDCP entity re-establishment. It will be appreciated that the method of FIG. 1 may be performed by a base station or a wireless device.

In step 101, the PDCP receiving entity receives receiving a request to perform PDCP entity re-establishment.

In step 102, responsive to the request, the PDCP receiving entity resets a header compression protocol by discarding any contexts associated with the header compression protocol. The removal of established contexts in transmitter and receiver avoids a mismatch of contexts for after the reset. The header compression protocol may be EHC or ROHC or any suitable header compression protocol.

In step 103, the PSCP receiving entity refrains from transmitting feedback associated with the header compression protocol to a PDCP transmitting entity. The feedback may comprise an indication of whether establishment of a context is successful.

According to current specifications, when EHC feedback is generated it is submitted to lower layers for transmission. During PDCP re-establishment procedure, in the receiving entity, stored PDCP service data units (SDUs) are decompressed (and delivered for PDCP unacknowledge mode (UM), and kept undelivered for PDCP Acknowledged mode (AM). If uncompressed full header packets are among those packets, the context establishment in the receiver would lead to generating the EHC feedback packet. Since however, at PDCP re-establishment, EHC is supposed to be reset at both compressor and decompressor (in order to synchronize them to the initial state), it does not make sense to submit this EHC feedback to lowers layers (as it is in current standards) for transmission after the PDCP re-establishment. On the contrary, EHC feedback generated before the EHC reset at PDCP re-establishment in the decompressor, if received after the PDCP re-establishment with EHC reset in the compressor, would lead to context mismatch. EHC feedback generation/submission should thus be avoided during PDCP re-establishment, which can be achieved by clarifying that EHC reset at PDCP re-establishment entails (beside EHC contexts removal) that EHC feedback is discarded (i.e. not submitted).

In some examples, the method may further comprise resuming transmission of feedback associated with the header compression protocol responsive to establishing a new context associated with the header compression protocol after completion of the PDCP entity re-establishment.

Figure 2:
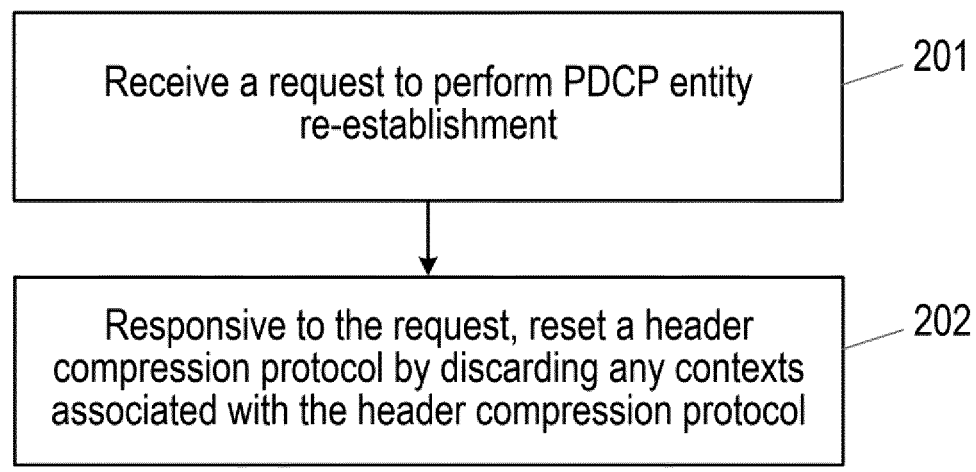
FIG. 2 is a flow chart illustrating a method in a PDCP transmitting entity in accordance with some embodiments.

FIG. 2 illustrates a method performed by a Packet Data Convergence Protocol, PDCP, transmitting entity. It will be appreciated that the method of FIG. 2 may be performed by a base station or a wireless device.

In step 201, the PDCP transmitting entity receives a request to perform PDCP entity re-establishment.

In step 202, the PDCP transmitting entity, responsive to the request, resets a header compression protocol by discarding any contexts associated with the header compression protocol. Similarly to as described with reference to step 102 in FIG. 1, this avoids context mismatch between the PDCP transmitting entity and the PDCP receiving entity.

In some embodiments therefore a PDCP receiving entity (for example a UE) that is undergoing PDCP re-establishment procedure does not submit EHC feedback. This may mean that EHC feedback is not generated for decompressed data during PDCP re-establishment procedure. It may also mean that EHC feedback is discarded or removed from future transmissions, when EHC protocol is reset during PDCP re-establishment.

This embodiment is exemplified in the specification text below (changes highlighted in bold). In which it is shown that to reset the header compression protocol (in this example EHC) the PDCP receiving entity refrains from transmitting EHC feedback. The PDCP receiving entity in this example also performing header decompression according to the header compression protocol for all stored PDCP service data units, SDUs, without generating feedback associated with the header decompression. In other words any feedback that has already been generated when the PDCP receiving entity receiving the request to perform PDCP entity re-establishment may not be transmitted, and any no further feedback may be generated for the decompression of any stored PDCP SDUs.

It will be appreciated that the example illustrated in the specification text below is for the EHC protocol, but that the invention may be applied to any suitable header compression protocol. For example, in some embodiments what is illustrated for EHC feedback below, also applies to robust header compression (ROHC) feedback. In other words, any ROHC feedback potentially generated during PDCP re-establishment is discarded, i.e. not transmitted, or not generated in the first place.

Example Specification Text (Updated Version of TS 38.323)

PDCP Entity Re-Establishment

When upper layers request a PDCP entity re-establishment, the UE shall additionally perform once the procedures described in this clause for Uu or PC5 interface. After performing the procedures in this clause, the UE shall follow the procedures in clause 5.2 of 3GPP TS 38.323 v16.2.0.

When upper layers request a PDCP entity re-establishment, the transmitting PDCP entity shall:

for UM DRBs and AM DRBs, reset the ROHC protocol for uplink and start with an IR state in U-mode (as defined in RFC 3095 [8] and RFC 4815 [9]) if drb-ContinueROHC is not configured in TS 38.331;

for UM DRBs and AM DRBs, reset the EHC protocol (i.e. remove all "EHC contexts") for uplink if drb-ContinueEHC-UL is not configured in TS 38.331;

for UM DRBs and SRBs, set TX_NEXT to the initial value;

for SRBs, discard all stored PDCP SDUs and PDCP Protocol Data units (PDUs);

apply the ciphering algorithm and key provided by upper layers during the PDCP entity re-establishment procedure;

apply the integrity protection algorithm and key provided by upper layers during the PDCP entity re-establishment procedure;

for UM DRBs, for each PDCP SDU already associated with a PDCP SN but for which a corresponding PDU has not previously been submitted to lower layers, and;

for suspended AM DRBs for Uu interface, from the first PDCP SDU for which the successful delivery of the corresponding PDCP Data PDU has not been confirmed by lower layers, for each PDCP SDU already associated with a PDCP SN:

consider the PDCP SDUs as received from upper layer;

perform transmission of the PDCP SDUs in ascending order of the COUNT value associated to the PDCP SDU prior to the PDCP re-establishment without restarting the discardTimer, as specified in clause 5.2.1 of 3GPP TS 38.323 v16.2.0;

for AM DRBs which were not suspended, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment as specified below:

perform header compression of the PDCP SDU using ROHC as specified in the clause 5.7.4 of 3GPP TS 38.323 v16.2.0 and/or using EHC as specified in the clause 5.12.4 of 3GPP TS 38.323 v16.2.0;

perform integrity protection and ciphering of the PDCP SDU using the COUNT value associated with this PDCP SDU as specified in the clause 5.9 and 5.8;

submit the resulting PDCP Data PDU to lower layer, as specified in clause 5.2.1.

When upper layers request a PDCP entity re-establishment, the receiving PDCP entity shall:

process the PDCP Data PDUs that are received from lower layers due to the re-establishment of the lower layers, as specified in the clause 5.2.2.1;

for SRBs, discard all stored PDCP SDUs and PDCP PDUs;

for SRBs and UM DRBs, if t-Reordering is running:

stop and reset t-Reordering;

for UM DRBs, deliver all stored PDCP SDUs to the upper layers in ascending order of associated COUNT values after performing header decompression (without generating EHC feedback);

for AM DRBs for Uu interface, perform header decompression using ROHC for all stored PDCP SDUs if drb-ContinueROHC is not configured in TS 38.331;

for AM DRBs for PC5 interface, perform header decompression using ROHC for all stored PDCP IP SDUs;

for AM DRBs for Uu interface, perform header decompression using EHC for all stored PDCP SDUs (without generating EHC feedback) if drb-ContinueEHC-DL is not configured in TS 38.331;

for UM DRBs and AM DRBs, reset the ROHC protocol for downlink and start with NC state in U-mode (as defined in RFC 3095 [8] and RFC 4815 [9]) if drb-ContinueROHC is not configured in TS 38.331 [3];

for UM DRBs and AM DRBs, reset the EHC protocol (i.e. remove all "EHC contexts", discard all EHC feedback) for downlink if drb-ContinueEHC-DL is not configured in TS 38.331 [3];

for UM DRBs and SRBs, set RX_NEXT and RX_DELIV to the initial value;

apply the ciphering algorithm and key provided by upper layers during the PDCP entity re-establishment procedure;

apply the integrity protection algorithm and key provided by upper layers during the PDCP entity re-establishment procedure.

NOTE: After PDCP re-establishment on a sidelink SRB/DRB, UE determines when to transmit and receive with the new key and discard the old key as specified in TS 33.536 [14].

Figure 3:
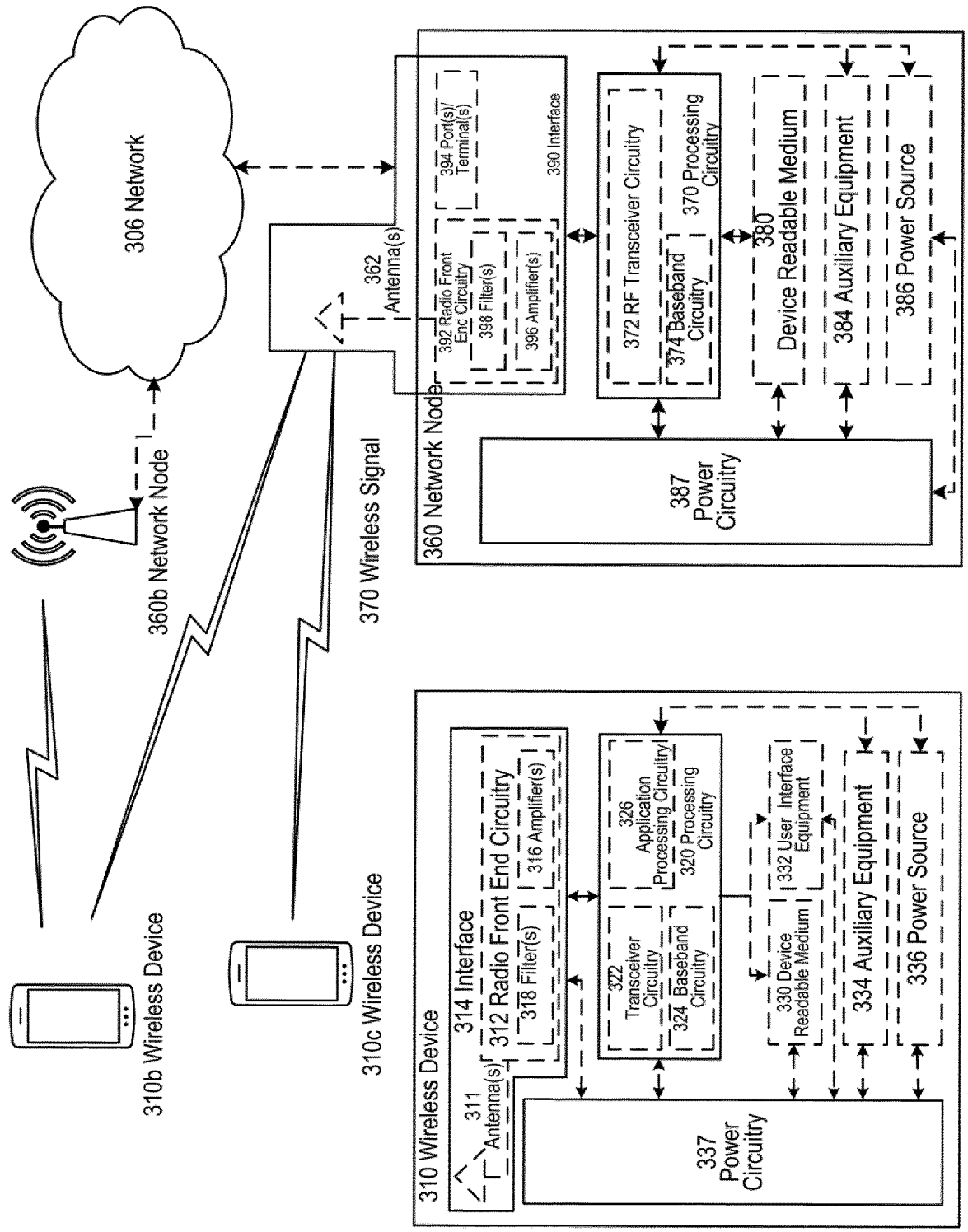
FIG. 3 shows an example of a communication system in accordance with some embodiments.

FIG. 3 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and WDs 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device (WD) 310 are depicted with additional detail. The network node 360 may act as a PDCP receiving entity or a PDCP transmitting entity as described above with reference to FIGS. 1 and 2. The wireless device 310 may act as a PDCP transmitting entity or a PDCP receiving entity as described above with reference to FIGS. 1 and 2. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314.

Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
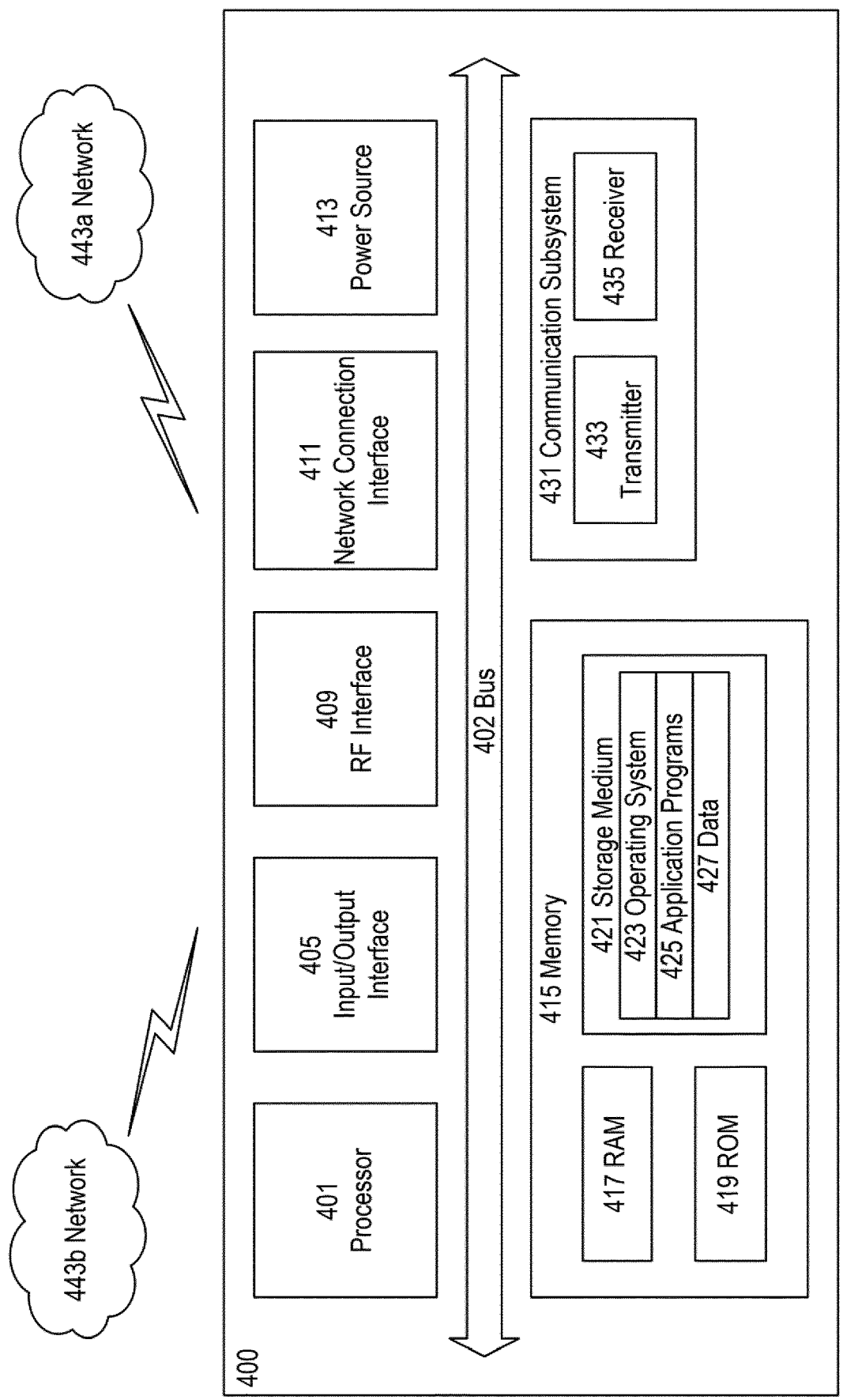
FIG. 4 shows a UE in accordance with some embodiments.

FIG. 4 shows a User Equipment in accordance with some embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeably. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
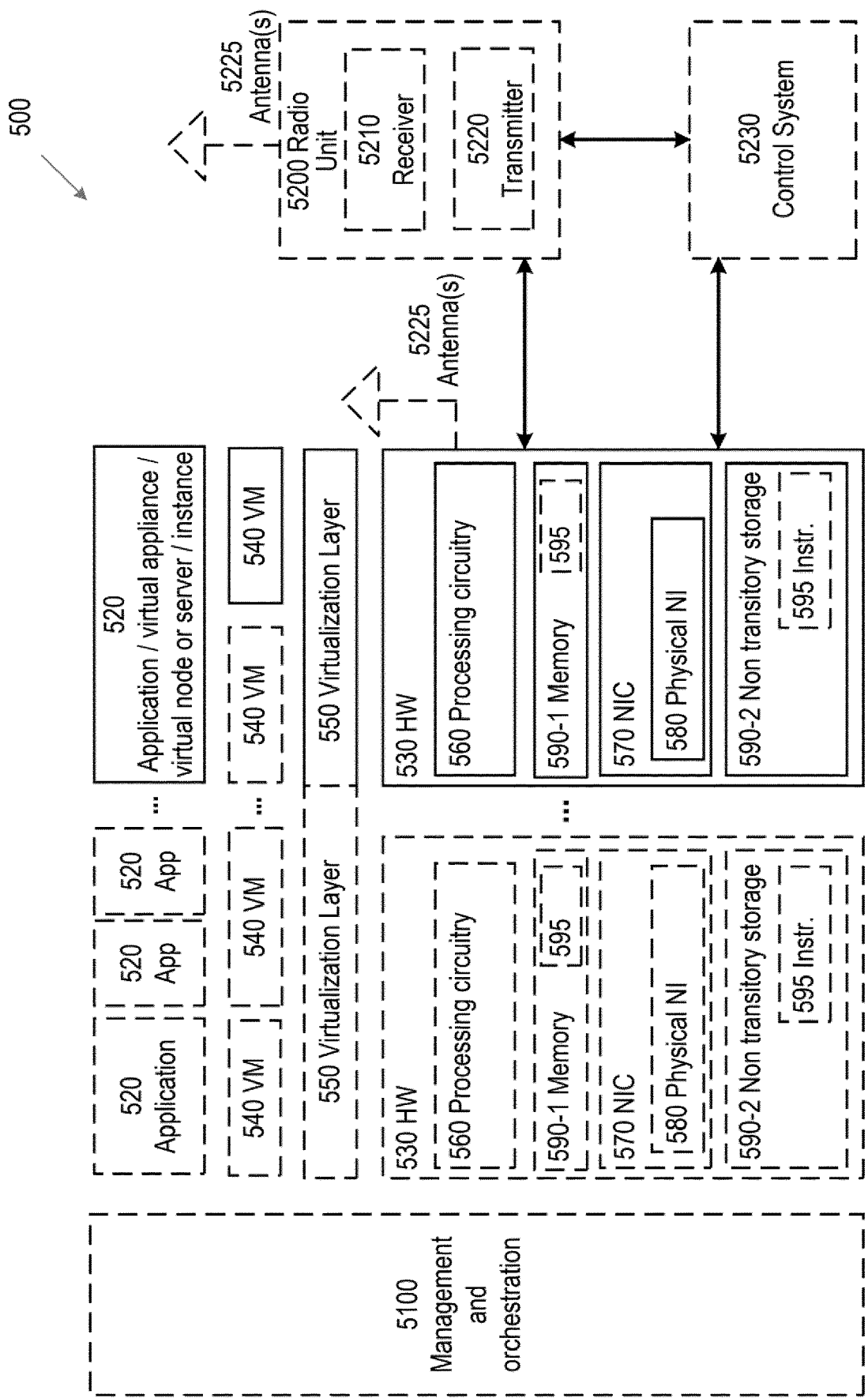
FIG. 5 shows a virtualization environment in accordance with some embodiments.

FIG. 5 shows a virtualization environment in accordance with some embodiments.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 6:
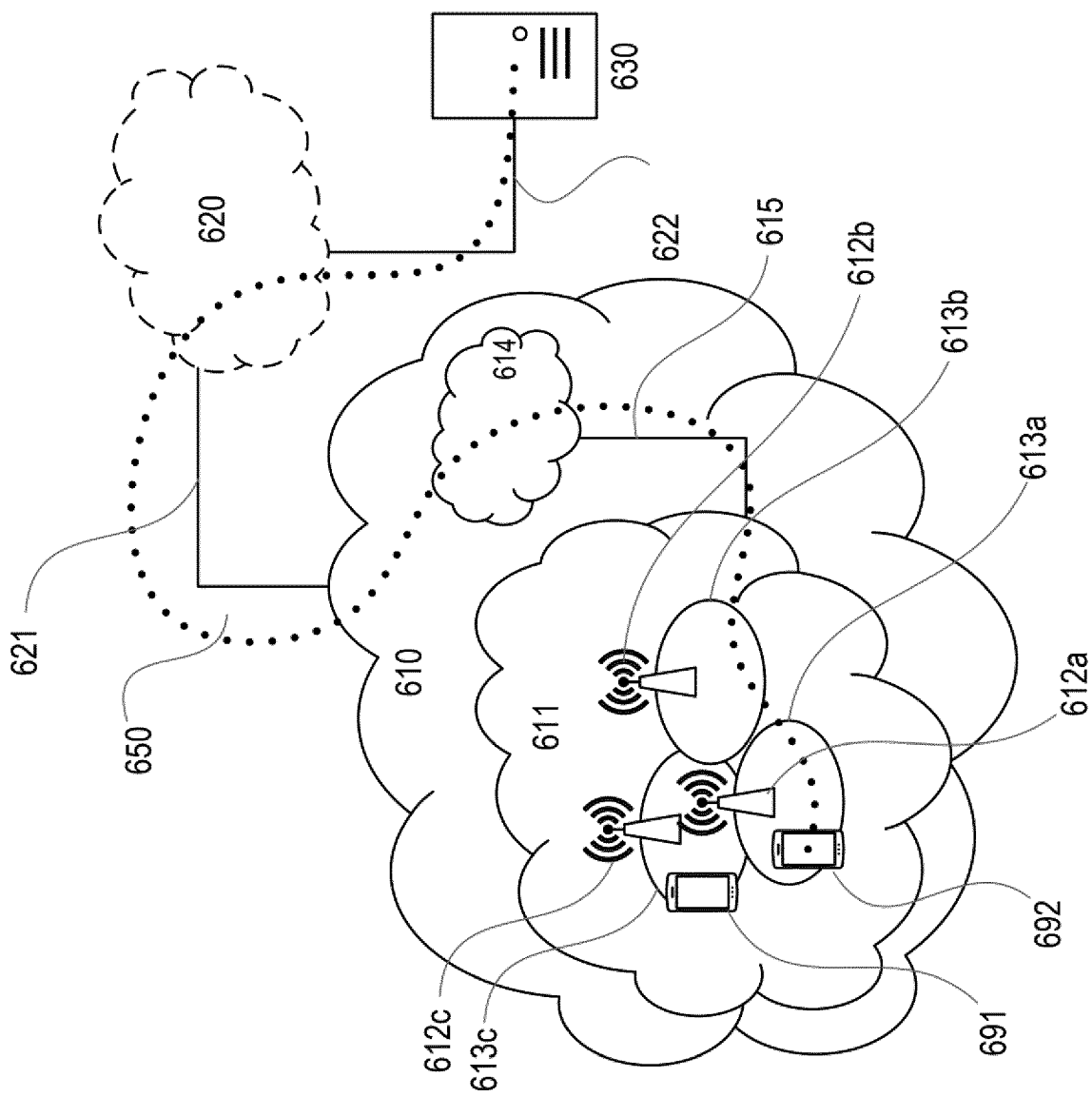
FIG. 6 shows a telecommunication network connected via an intermediate network to a host computer in accordance with some embodiments.

FIG. 6 shows a telecommunication network connected via an intermediate network to a host computer in accordance with some embodiments.

With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more sub-networks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 7:
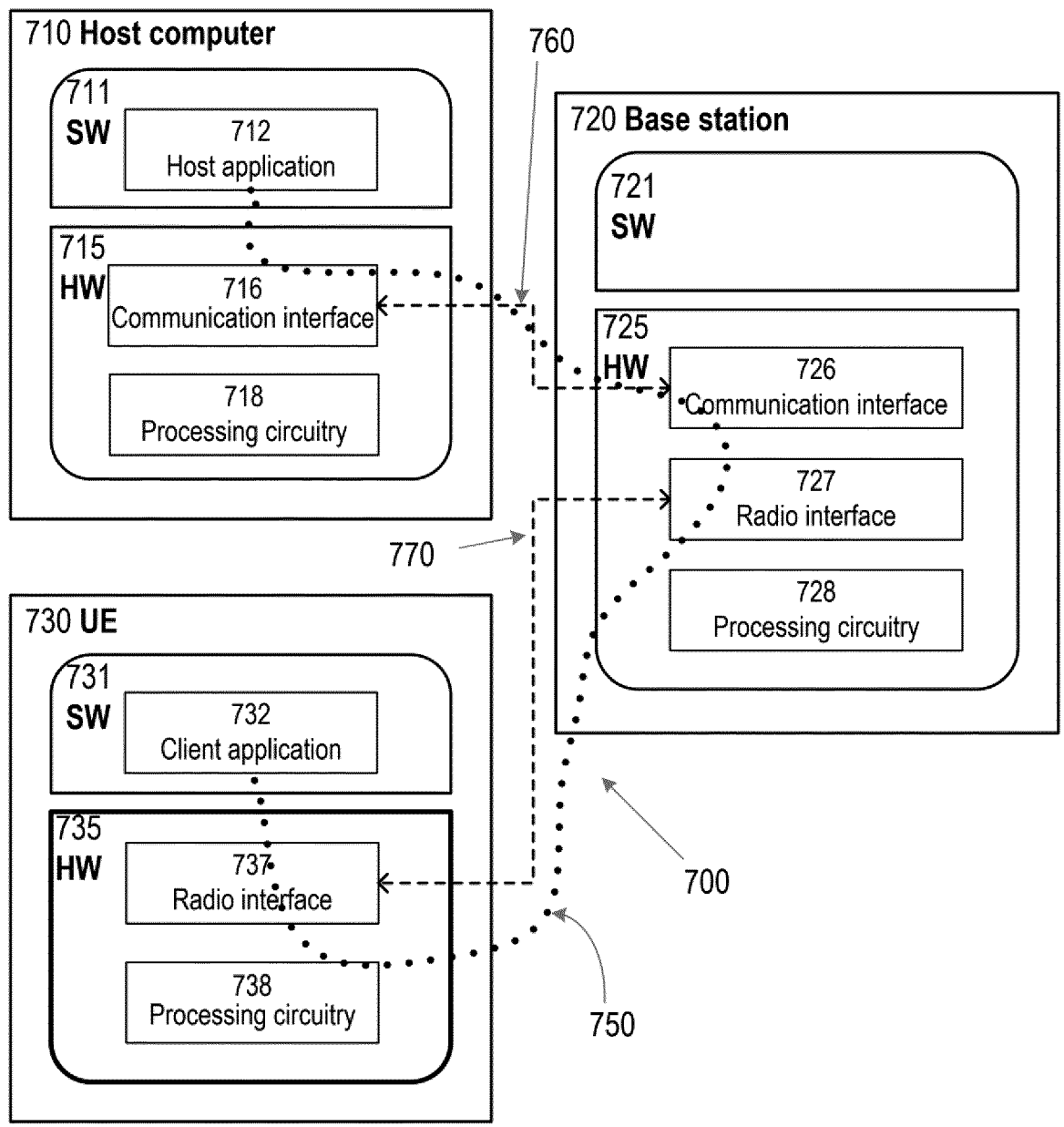
FIG. 7 shows a host computer communicating via a base station with a user equipment over a partially wireless connection in accordance with some embodiments.

FIG. 7 shows a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the synchronization between the PDCP receiving and transmitting entities and thereby provide benefits such as improved performance.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
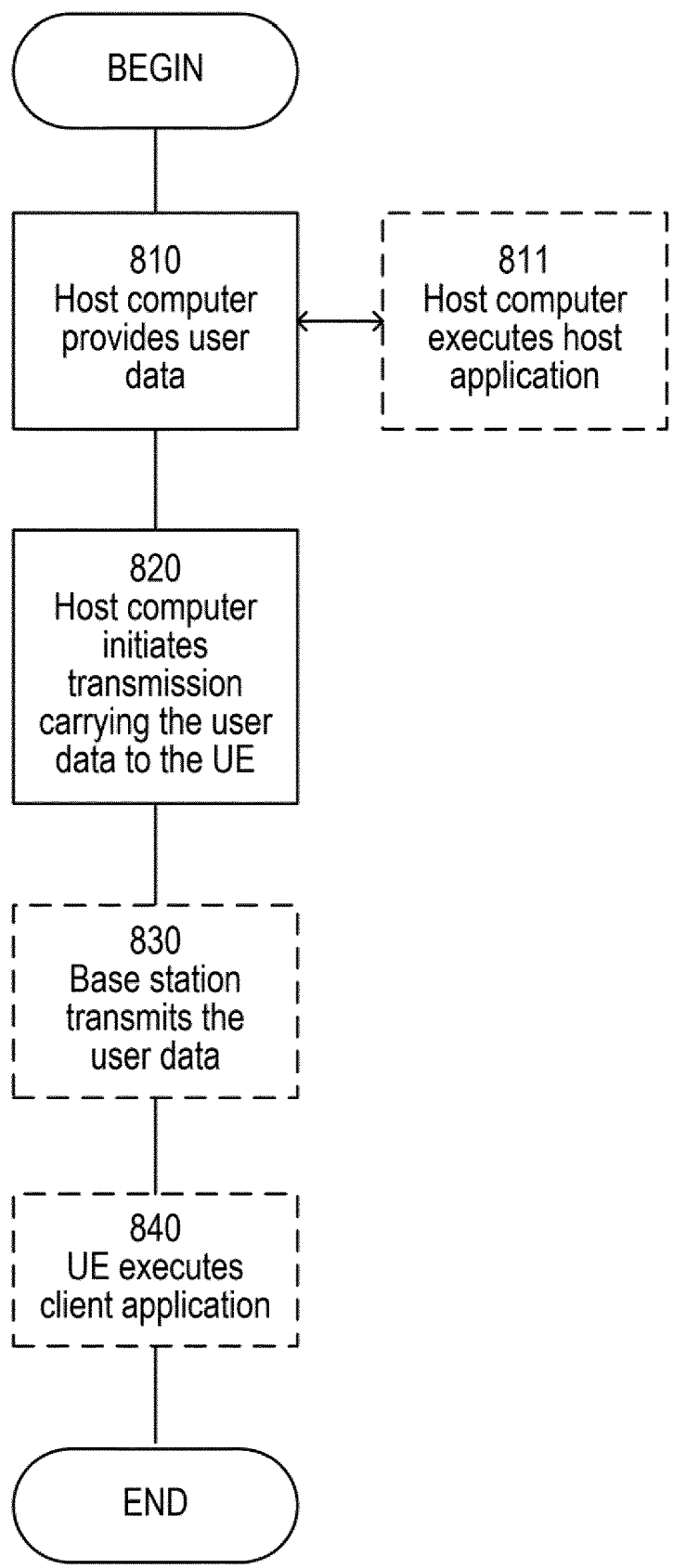
FIG. 8 shows methods implemented in a communication system including a host computer, a base station and a user equipment in accordance with some embodiments.

FIG. 8 shows methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
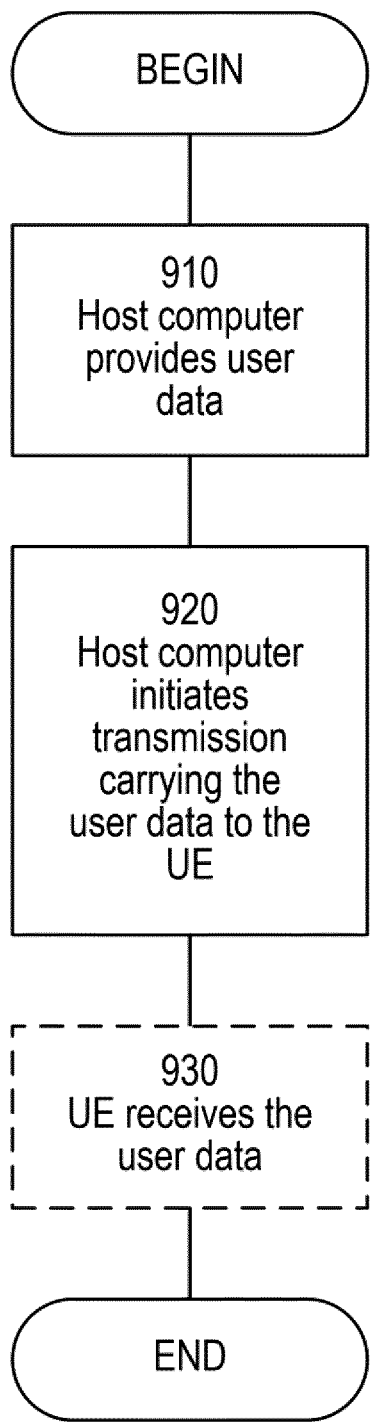
FIG. 9 shows methods implemented in a communication system including a host computer, a base station and a user equipment in accordance with some embodiments.

FIG. 9 shows methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
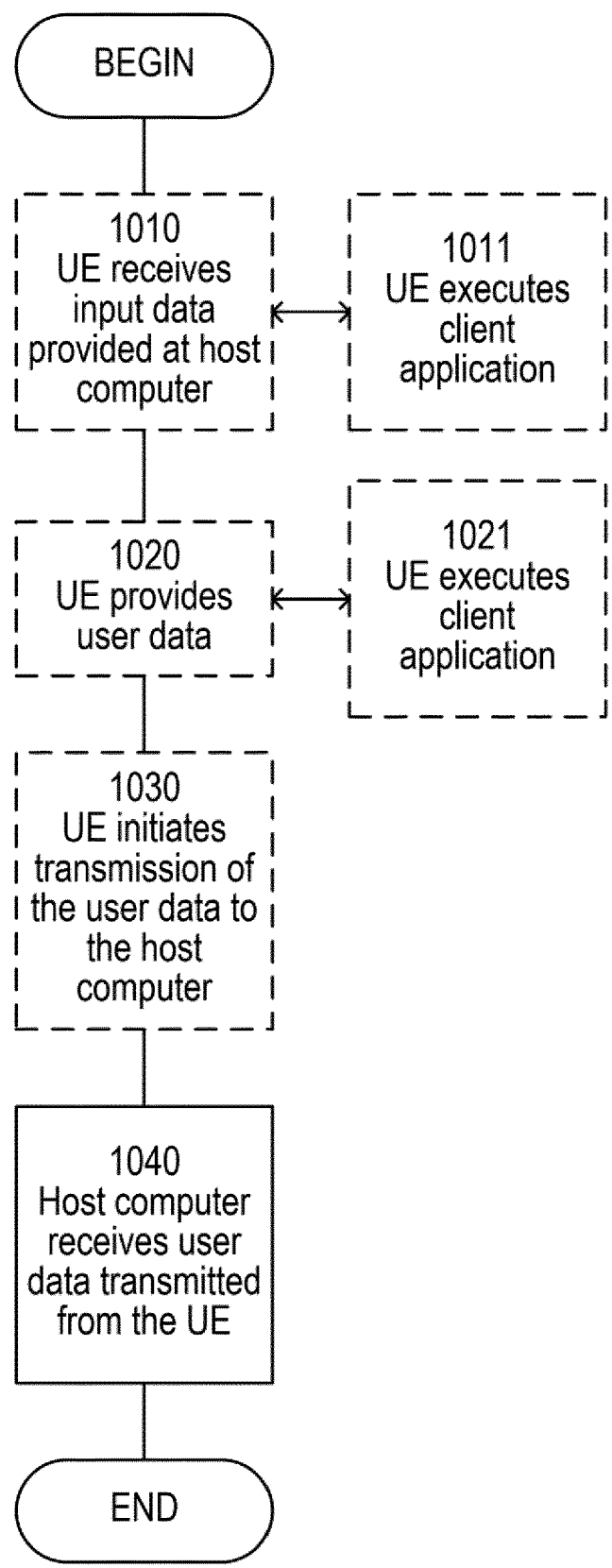
FIG. 10 shows methods implemented in a communication system including a host computer, a base station and a user equipment in accordance with some embodiments.

FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 11:
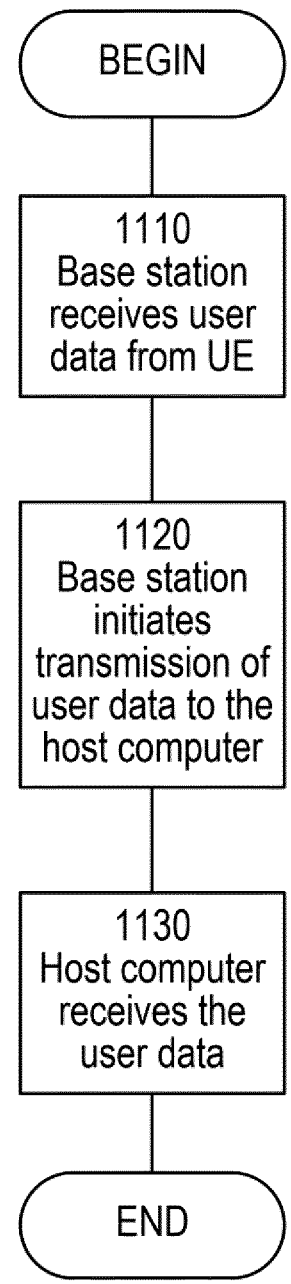
FIG. 11 shows methods implemented in a communication system including a host computer, a base station and a user equipment in accordance with some embodiments.

FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
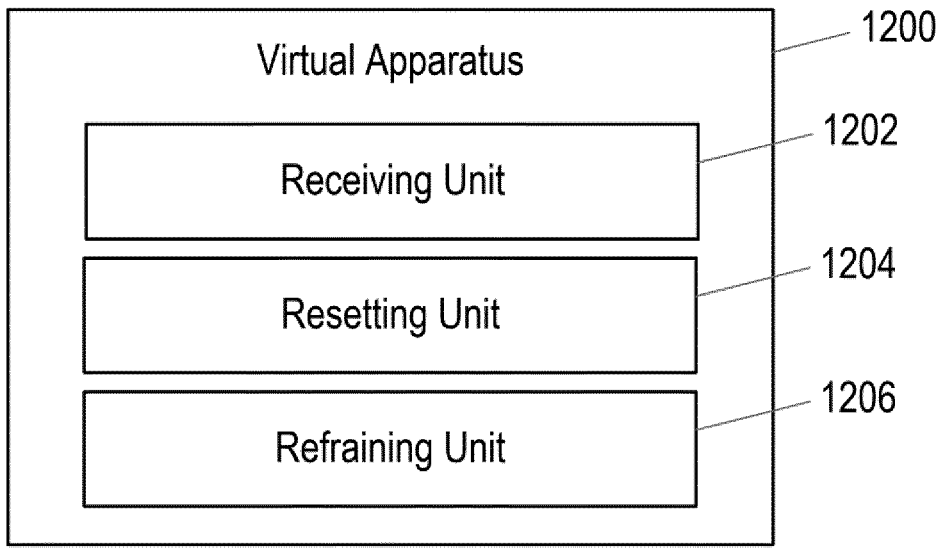
FIG. 12 shows a virtualization apparatus in accordance with some embodiments.

FIG. 12 shows a virtualization apparatus in accordance with some embodiments.

FIG. 12 illustrates a schematic block diagram of a PDCP receiving entity 1200 in a wireless network (for example, the wireless network shown in FIG. 3). The apparatus may be implemented in a wireless device or network node (e.g., wireless device 310 or network node 360 shown in FIG. 3). Apparatus 1200 is operable to carry out the example method described with reference to FIG. 1 and possibly any other processes or methods disclosed herein. It is also to be understood that the method of FIG. 1 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1202, resetting unit 1204, and refraining unit 1206, and any other suitable units of apparatus 1200 to perform corresponding functions according one or more embodiments of the present disclosure.

As illustrated in FIG. 12, apparatus 1200 includes receiving unit 1202, resetting unit 1204, and refraining unit 1206. Receiving unit 1202 is configured to receive a request to perform PDCP entity re-establishment. Resetting unit 1204 is configured to responsive to the request, reset a header compression protocol by discarding any contexts associated with the header compression protocol. Refraining unit 1206 is configured to refrain from transmitting feedback associated with the header compression protocol to a PDCP transmitting entity.

Figure 13:
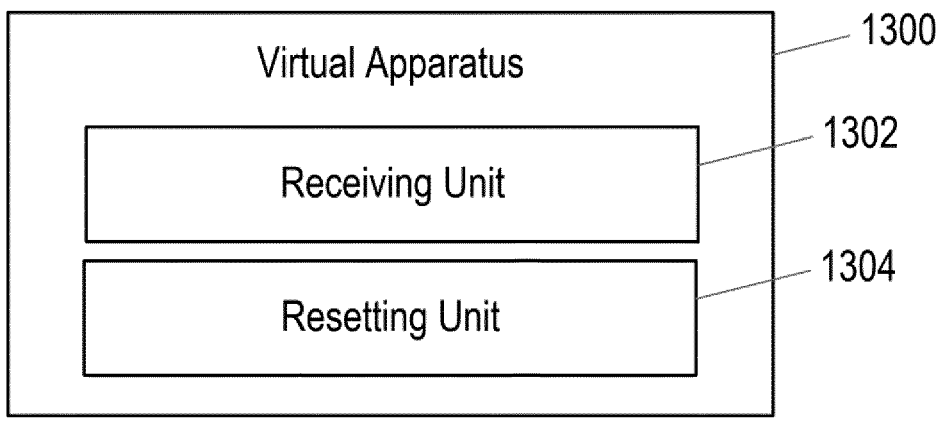
FIG. 13 shows another virtualization apparatus in accordance with some embodiments.

FIG. 13 shows another virtualization apparatus in accordance with some embodiments.

FIG. 13 illustrates a schematic block diagram of a PDCP receiving entity 1300 in a wireless network (for example, the wireless network shown in FIG. 3). The apparatus may be implemented in a wireless device or network node (e.g., wireless device 310 or network node 360 shown in FIG. 3). Apparatus 1300 is operable to carry out the example method described with reference to FIG. 2 and possibly any other processes or methods disclosed herein. It is also to be understood that the method of FIG. 2 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1302 and resetting unit 1304 and any other suitable units of apparatus 1300 to perform corresponding functions according one or more embodiments of the present disclosure.

As illustrated in FIG. 13, apparatus 1300 includes receiving unit 1302 and resetting unit 1304. Receiving unit 1302 is configured to receive a request to perform PDCP entity re-establishment. Resetting unit 1304 is configured to responsive to the request, reset a header compression protocol by discarding any contexts associated with the header compression protocol. The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Group A Embodiments

1. A method performed by a wireless device for performing Packet Data Convergence Protocol, PDCP, entity re-establishment, wherein the wireless device is acting as a Packet Data Convergence Protocol, PDCP, receiving entity, the method comprising:
receiving a request to perform PDCP entity re-establishment;
responsive to the request, resetting a header compression protocol by discarding any contexts associated with the header compression protocol, and refraining from transmitting feedback associated with the header compression protocol to a PDCP transmitting entity.

2. The method as in embodiment 1 further comprising: responsive to the request, performing header decompression according to the header compression protocol for all stored PDCP service data units, SDUs, without generating feedback associated with the header decompression.

3. The method as in embodiment 1 or 2 wherein the header compression protocol comprises Ethernet header compression, EHC, protocol.

4. The method as in embodiment 1 or 2 wherein the header compression protocol comprises robust header compression, ROHC, protocol.

5. The method as in any previous embodiment wherein the feedback comprises an indication of whether establishment of a context is successful.

6. The method as in any previous embodiment further comprising: resuming transmission of feedback associated with the header compression protocol responsive to establishing a new context associated with the header compression protocol after completion of the PDCP entity re-establishment.

6. A method performed by a wireless device for performing Packet Data Convergence Protocol, PDCP, entity re-establishment, wherein the wireless device is acting as a Packet Data Convergence Protocol, PDCP, transmitting entity, the method comprising:
receiving a request to perform PDCP entity re-establishment; and
responsive to the request, resetting a header compression protocol by discarding any contexts associated with the header compression protocol.

7. The method as in embodiment 6 wherein the header compression protocol comprises Ethernet header compression, EHC, protocol.

8. The method as in embodiment 6 wherein the header compression protocol comprises robust header compression, ROHC, protocol.

9. The method of any of the previous embodiments, further comprising:
providing user data; and
forwarding the user data to a host computer via the transmission to the base station.

Group B Embodiments

10. A method performed by a base station for performing Packet Data Convergence Protocol, PDCP, entity re-establishment, wherein the base station is acting as a PDCP receiving entity, the method comprising:
receiving a request to perform PDCP entity re-establishment;
responsive to the request, resetting a header compression protocol by discarding any contexts associated with the header compression protocol, and
refraining from transmitting feedback associated with the header compression protocol to a PDCP transmitting entity.

11. The method of embodiment 10 further comprising responsive to the request, performing header decompression according to the header compression protocol for all stored PDCP service data units, SDUs, without generating feedback associated with the header decompression.

12. The method of embodiment 10 or 11 wherein the header compression protocol comprises Ethernet header compression, EHC, protocol.

13. The method of embodiment 10 or 11 wherein the header compression protocol comprises robust header compression, ROHC, protocol.

14. The method as in any one of embodiments 10 to 13 wherein the feedback comprises an indication of whether establishment of a context is successful.

15. The method as in any one of embodiments 10 to 14 further comprising: resuming transmission of feedback associated with the header compression protocol responsive to establishing a new context associated with the header compression protocol after completion of the PDCP entity re-establishment.

16. The method of any of the previous embodiments, further comprising:
obtaining user data; and
forwarding the user data to a host computer or a wireless device.

17. A method performed by a wireless device for performing Packet Data Convergence Protocol, PDCP, entity re-establishment, wherein the wireless device is acting as a Packet Data Convergence Protocol, PDCP, transmitting entity, the method comprising:
receiving a request to perform PDCP entity re-establishment; and
responsive to the request, resetting a header compression protocol by discarding any contexts associated with the header compression protocol.

18. The method as in embodiment 17 wherein the header compression protocol comprises Ethernet header compression, EHC, protocol.

19. The method as in embodiment 17 wherein the header compression protocol comprises robust header compression, ROHC, protocol.

Group C Embodiments

20. A wireless device for performing Packet Data Convergence Protocol, PDCP, entity re-establishment, the wireless device comprising:
processing circuitry configured to perform any of the steps of any of the Group A embodiments; and
power supply circuitry configured to supply power to the wireless device.

21. A base station for r performing Packet Data Convergence Protocol, PDCP, entity re-establishment, the base station comprising:
processing circuitry configured to perform any of the steps of any of the Group B embodiments;
power supply circuitry configured to supply power to the base station.

22. A user equipment (UE) for r performing Packet Data Convergence Protocol, PDCP, entity re-establishment, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

23. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

24. The communication system of the previous embodiment further including the base station.

25. The communication system of the previous 2 embodiments, further including the UE, wherein the UE is configured to communicate with the base station.

26. The communication system of the previous 3 embodiments, wherein:

the processing circuitry of the host computer is configured to execute a host application, thereby providing the user data; and the UE comprises processing circuitry configured to execute a client application associated with the host application.

27. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

28. The method of the previous embodiment, further comprising, at the base station, transmitting the user data.

29. The method of the previous 2 embodiments, wherein the user data is provided at the host computer by executing a host application, the method further comprising, at the UE, executing a client application associated with the host application.

30. A user equipment (UE) configured to communicate with a base station, the UE comprising a radio interface and processing circuitry configured to performs the of the previous 3 embodiments.

31. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

32. The communication system of the previous embodiment, wherein the cellular network further includes a base station configured to communicate with the UE.

33. The communication system of the previous 2 embodiments, wherein:

the processing circuitry of the host computer is configured to execute a host application, thereby providing the user data; and the UE's processing circuitry is configured to execute a client application associated with the host application.

34. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

35. The method of the previous embodiment, further comprising at the UE, receiving the user data from the base station.

36. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

37. The communication system of the previous embodiment, further including the UE.

38. The communication system of the previous 2 embodiments, further including the base station, wherein the base station comprises a radio interface configured to communicate with the UE and a communication interface configured to forward to the host computer the user data carried by a transmission from the UE to the base station.

39. The communication system of the previous 3 embodiments, wherein:

the processing circuitry of the host computer is configured to execute a host application; and the UE's processing circuitry is configured to execute a client application associated with the host application, thereby providing the user data.

40. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

41. A method implemented in a communication system including a host computer, a base station and a user equipment (UE), the method comprising:

at the host computer, receiving user data transmitted to the base station from the UE, wherein the UE performs any of the steps of any of the Group A embodiments.

42. The method of the previous embodiment, further comprising, at the UE, providing the user data to the base station.

43. The method of the previous 2 embodiments, further comprising:

at the UE, executing a client application, thereby providing the user data to be transmitted; and at the host computer, executing a host application associated with the client application.

44. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

45. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

46. The communication system of the previous embodiment further including the base station.

47. The communication system of the previous 2 embodiments, further including the UE, wherein the UE is configured to communicate with the base station.

48. The communication system of the previous 3 embodiments, wherein:
   the processing circuitry of the host computer is configured to execute a host application;
   the UE is configured to execute a client application associated with the host application, thereby providing the user data to be received by the host computer.

49. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

50. The method of the previous embodiment, further comprising at the base station, receiving the user data from the UE.

51. The method of the previous 2 embodiments, further comprising at the base station, initiating a transmission of the received user data to the host computer.

APPENDIX

3GPP TSG-RAN WG2 #112-e
Electronic, Nov. 2-13, 2020
Agenda Item: 6.5.4.2
Source: Ericsson
Title: Corrections for EHC
Document for: Discussion, Decision

1. INTRODUCTION

This paper addresses EHC related corrections.

2. DISCUSSION

At PDCP re-establishment, when drb-ContinueEHC-UL/DL is not configured, the EHC protocol is reset. But, in current specifications, it is not further clarified, what "the reset" actually means for the EHC protocol. We discuss in the following how these unclarities for the UE behaviour can be corrected.

For ROHC, the standard clearly states that for ROHC reset, ROHC is supposed to start in IR state in U-mode, which is a clearly defined fallback state in the ROHC specifications. In the 38.323 Annex A, where EHC is defined, it is however remaining unclear what reset for EHC means.

One obvious part of the EHC reset is the removal of established contexts in transmitter and receiver, to avoid a mismatch of contexts after the reset.

Another aspect we should pay attention to is what happens to EHC feedback. When EHC feedback is generated, according to current specifications, it is submitted to lower layers for transmission. During PDCP re-establishment procedure, in the receiving entity, stored PDCP SDUs are decompressed (and delivered for UM, and kept undelivered for AM). If uncompressed full header packets are among those packets, the context establishment in the receiver would lead to generating the EHC feedback packet. Since however, at PDCP re-establishment, EHC is supposed to be reset at both compressor and decompressor (in order to synchronize them to the initial state), it does not make sense to submit this EHC feedback to lowers layers (as it is in current standards) for transmission after the PDCP re-establishment. On the contrary, EHC feedback generated before the EHC reset at PDCP re-establishment in the decompressor, if received after the PDCP re-establishment with EHC reset in the compressor, would lead to context mismatch. EHC feedback generation/submission should thus be avoided during PDCP re-establishment, which can be achieved by clarifying that EHC reset at PDCP re-establishment entails (beside EHC contexts removal) that EHC feedback is discarded (i.e. not submitted).

Proposal 1 Clarify EHC reset at PDCP re-establishment includes EHC contexts removal in compressor and decompressor, as well as EHC feedback discarding in decompressor.

ATP can be found in the annex.

3. CONCLUSION

In the previous sections we made the following proposals:
Proposal 1 Clarify EHC reset at PDCP re-establishment includes EHC contexts removal in compressor and decompressor, as well as EHC feedback discarding in decompressor.

4. TP 38.323
5.1.2 PDCP Entity Re-Establishment
When upper layers request a PDCP entity re-establishment, the UE shall additionally perform once the procedures described in this clause for Uu or PC5 interface. After performing the procedures in this clause, the UE shall follow the procedures in clause 5.2.

When upper layers request a PDCP entity re-establishment, the transmitting PDCP entity shall:
   for UM DRBs and AM DRBs, reset the ROHC protocol for uplink and start with an IR state in U-mode (as defined in RFC 3095 [8] and RFC 4815 [9]) if drb-ContinueROHC is not configured in TS 38.331 [3];
   for UM DRBs and AM DRBs, reset the EHC protocol (i.e. remove all "EHC contexts") for uplink if drb-ContinueEHC-UL is not configured in TS 38.331 [3];
   for UM DRBs and SRBs, set TX_NEXT to the initial value;
   for SRBs, discard all stored PDCP SDUs and PDCP PDUs;

apply the ciphering algorithm and key provided by upper layers during the PDCP entity re-establishment procedure;

apply the integrity protection algorithm and key provided by upper layers during the PDCP entity re-establishment procedure;

for UM DRBs, for each PDCP SDU already associated with a PDCP SN but for which a corresponding PDU has not previously been submitted to lower layers, and;

for suspended AM DRBs for Uu interface, from the first PDCP SDU for which the successful delivery of the corresponding PDCP Data PDU has not been confirmed by lower layers, for each PDCP SDU already associated with a PDCP SN:

consider the PDCP SDUs as received from upper layer;

perform transmission of the PDCP SDUs in ascending order of the COUNT value associated to the PDCP SDU prior to the PDCP re-establishment without restarting the discardTimer, as specified in clause 5.2.1;

for AM DRBs which were not suspended, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment as specified below:

perform header compression of the PDCP SDU using ROHC as specified in the clause 5.7.4 and/or using EHC as specified in the clause 5.12.4;

perform integrity protection and ciphering of the PDCP SDU using the COUNT value associated with this PDCP SDU as specified in the clause 5.9 and 5.8;

submit the resulting PDCP Data PDU to lower layer, as specified in clause 5.2.1.

When upper layers request a PDCP entity re-establishment, the receiving PDCP entity shall:

process the PDCP Data PDUs that are received from lower layers due to the re-establishment of the lower layers, as specified in the clause 5.2.2.1;

for SRBs, discard all stored PDCP SDUs and PDCP PDUs;

for SRBs and UM DRBs, if t-Reordering is running: stop and reset t-Reordering;

for UM DRBs, deliver all stored PDCP SDUs to the upper layers in ascending order of associated COUNT values after performing header decompression;

for AM DRBs for Uu interface, perform header decompression using ROHC for all stored PDCP SDUs if drb-ContinueROHC is not configured in TS 38.331 [3];

for AM DRBs for PC5 interface, perform header decompression using ROHC for all stored PDCP IP SDUs;

for AM DRBs for Uu interface, perform header decompression using EHC for all stored PDCP SDUs if drb-ContinueEHC-DL is not configured in TS 38.331 [3];

for UM DRBs and AM DRBs, reset the ROHC protocol for downlink and start with NC state in U-mode (as defined in RFC 3095 [8] and RFC 4815 [9]) if drb-ContinueROHC is not configured in TS 38.331 [3];

for UM DRBs and AM DRBs, reset the EHC protocol (i.e. remove all "EHC contexts", discard all EHC feedback) for downlink if drb-ContinueEHC-DL is not configured in TS 38.331 [3];

for UM DRBs and SRBs, set RX_NEXT and RX_DELIV to the initial value;

apply the ciphering algorithm and key provided by upper layers during the PDCP entity re-establishment procedure;

apply the integrity protection algorithm and key provided by upper layers during the PDCP entity re-establishment procedure.

NOTE: After PDCP re-establishment on a sidelink SRB/DRB, UE determines when to transmit and receive with the new key and discard the old key as specified in TS 33.536 [14].

Abbreviations

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| AM | Acknowledged Mode |
| CID | Context Identifier |
| DRB | Data Radio Bearer carrying user plane data |
| gNB | NR Node B |
| HFN | Hyper Frame Number |
| IETF | Internet Engineering Task Force |
| IP | Internet Protocol |
| MAC | Medium Access Control |
| MAC-I | Message Authentication Code for Integrity |
| PDCP | Packet Data Convergence Protocol |
| PDU | Protocol Data Unit |
| RB | Radio Bearer |
| RFC | Request For Comments |
| RLC | Radio Link Control |
| ROHC | RObust Header Compression |
| RRC | Radio Resource Control |
| RTP | Real Time Protocol |
| SAP | Service Access Point |
| SDU | Service Data Unit |
| SN | Sequence Number |
| SRB | Signalling Radio Bearer carrying control plane data |
| TCP | Transmission Control Protocol |
| UDP | User Datagram Protocol |
| UE | User Equipment |
| UM | Unacknowledged Mode |
| X-MAC | Computed MAC-I |
| 1× RTT | CDMA2000 1× Radio Transmission Technology |
| 3GPP | 3rd Generation Partnership Project |
| 5G | 5th Generation |
| ABS | Almost Blank Subframe |
| ARQ | Automatic Repeat Request |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CP | Cyclic Prefix |
| CPICH | Common Pilot Channel |
| CPICH Ec/No | CPICH Received energy per chip divided by the power density in the band |
| CQI | Channel Quality information |
| C-RNTI | Cell RNTI |
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |

-continued

| | |
|---|---|
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| FFS | For Further Study |
| GERAN | GSM EDGE Radio Access Network |
| gNB | Base station in NR |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |
| PUSCH | Physical Uplink Shared Channel |
| RACH | Random Access Channel |
| QAM | Quadrature Amplitude Modulation |
| RAN | Radio Access Network |
| RAT | Radio Access Technology |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal to Noise Ratio |

-continued

| | |
|---|---|
| SON | Self Optimized Network |
| SS | Synchronization Signal |
| SSS | Secondary Synchronization Signal |
| TDD | Time Division Duplex |
| TDOA | Time Difference of Arrival |
| TOA | Time of Arrival |
| TSS | Tertiary Synchronization Signal |
| TTI | Transmission Time Interval |
| UE | User Equipment |
| UL | Uplink |
| UMTS | Universal Mobile Telecommunication System |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| WCDMA | Wide CDMA |
| WLAN | Wide Local Area Network |

The invention claimed is:

1. A method performed by a wireless device for performing Packet Data Convergence Protocol, PDCP, entity re-establishment, wherein the wireless device is acting as a Packet Data Convergence Protocol, PDCP, receiving entity, the method comprising:
receiving a request to perform PDCP entity re-establishment;
responsive to the request, resetting a header compression protocol by discarding any contexts associated with the header compression protocol,
refraining from transmitting feedback associated with the header compression protocol to a PDCP transmitting entity; and
resuming generation and transmission of feedback associated with the header compression protocol responsive to establishing a new context associated with the header compression protocol after completion of the PDCP entity re-establishment.

2. The method as in claim 1, further comprising:
responsive to the request, performing header decompression according to the header compression protocol for all stored PDCP service data units, SDUs, without generating feedback associated with the header decompression.

3. The method as in claim 1, wherein the step of refraining from transmitting comprises discarding any feedback associated with the header compression protocol that was generated prior to receiving the request to perform PDCP entity re-establishment and that had not yet been transmitted to the PDCP transmitting entity.

4. The method as in claim 1, wherein the feedback comprises an indication of whether establishment of a context is successful.

5. A method performed by a base station for performing Packet Data Convergence Protocol, PDCP, entity re-establishment, wherein the base station is acting as a PDCP receiving entity, the method comprising:
receiving a request to perform PDCP entity re-establishment;
responsive to the request, resetting a header compression protocol by discarding any contexts associated with the header compression protocol,
refraining from transmitting feedback associated with the header compression protocol to a PDCP transmitting entity; and
resuming generation and transmission of feedback associated with the header compression protocol responsive to establishing a new context associated with the header compression protocol after completion of the PDCP entity re-establishment.

6. The method of claim 5, further comprising responsive to the request, performing header decompression according to the header compression protocol for all stored PDCP service data units, SDUs, without generating feedback associated with the header decompression.

7. The method as in claim 5, wherein the step of refraining from transmitting comprises discarding any feedback associated with the header compression protocol that was generated prior to receiving the request to perform PDCP entity re-establishment and that had not yet been transmitted to the PDCP transmitting entity.

8. The method as in claim 5, wherein the feedback comprises an indication of whether establishment of a context is successful.

9. A wireless device for performing Packet Data Convergence Protocol, PDCP, entity re-establishment, wherein the wireless device is acting as a Packet Data Convergence Protocol, PDCP, receiving entity, the wireless device configured to:
 receive a request to perform PDCP entity re-establishment;
 responsive to the request, reset a header compression protocol by discarding any contexts associated with the header compression protocol, and
 refrain from transmitting feedback associated with the header compression protocol to a PDCP transmitting entity; and
 resume generation and transmission of feedback associated with the header compression protocol responsive to establishing a new context associated with the header compression protocol after completion of the PDCP entity re-establishment.

10. The wireless device as in claim 9, further configured to:
 responsive to the request, perform header decompression according to the header compression protocol for all stored PDCP service data units, SDUs, without generating feedback associated with the header decompression.

11. The wireless device as in claim 9, wherein the wireless device is configured to refrain from transmitting by discarding any feedback associated with the header compression protocol that was generated prior to receiving the request to perform PDCP entity re-establishment and that had not yet been transmitted to the PDCP transmitting entity.

12. The wireless device as in claim 9, wherein the feedback comprises an indication of whether establishment of a context is successful.

13. A base station for performing Packet Data Convergence Protocol, PDCP, entity re-establishment, wherein the base station is acting as a PDCP receiving entity, the base station configured to:
 receive a request to perform PDCP entity re-establishment;
 responsive to the request, reset a header compression protocol by discarding any contexts associated with the header compression protocol,
 refrain from transmitting feedback associated with the header compression protocol to a PDCP transmitting entity; and
 resume transmission of feedback associated with the header compression protocol responsive to establishing a new context associated with the header compression protocol after completion of the PDCP entity re-establishment.

14. The base station of claim 13, further configured to, responsive to the request, perform header decompression according to the header compression protocol for all stored PDCP service data units, SDUs, without generating feedback associated with the header decompression.

15. The base station as in claim 13, wherein the base station is configured to refrain from transmitting by discarding any feedback associated with the header compression protocol that was generated prior to receiving the request to perform PDCP entity re-establishment and that had not yet been transmitted to the PDCP transmitting entity.

16. The base station as in claim 13, wherein the feedback comprises an indication of whether establishment of a context is successful.

\* \* \* \* \*